United States Patent [19]

Cho

[11] Patent Number: 4,973,869
[45] Date of Patent: Nov. 27, 1990

[54] BRUSHLESS CORELESS DC MOTOR

[75] Inventor: Doo-Man Cho, Seoul, Rep. of Korea

[73] Assignee: Samsung Electro-Mechanics Co., Ltd., Kyungki, Rep. of Korea

[21] Appl. No.: 384,140

[22] Filed: Jul. 24, 1989

[30] Foreign Application Priority Data

Jul. 29, 1988 [KR] Rep. of Korea ............ 88-9610

[51] Int. Cl.$^5$ .............. H02K 11/00; H02P 6/00; H02P 6/02
[52] U.S. Cl. ............... 310/68 B; 310/68 R; 310/268; 310/DIG. 3; 318/254
[58] Field of Search ........... 310/67 R, 156, 186, 310/190, 268, DIG. 3, DIG. 6, 68 B, 68 R, 254; 318/254

[56] References Cited

U.S. PATENT DOCUMENTS

| | | | |
|---|---|---|---|
| 4,620,139 | 10/1986 | Egami et al. | 318/254 |
| 4,704,566 | 11/1987 | Hirano et al. | 310/216 |
| 4,724,350 | 2/1988 | Shiraki et al. | 310/268 |
| 4,728,833 | 3/1988 | Shiraki et al. | 310/67 R |
| 4,733,119 | 3/1988 | Shiraki et al. | 310/268 |
| 4,757,222 | 7/1988 | Shiraki et al. | 310/268 |

FOREIGN PATENT DOCUMENTS

| | | | |
|---|---|---|---|
| 0023714 | 2/1980 | Japan | 310/268 |
| 192674 | 11/1986 | Japan . | |
| 2367 | 1/1987 | Japan . | |
| 192676 | 11/1987 | Japan . | |

Primary Examiner—Steven L. Stephan
Assistant Examiner—C. E. LaBalle
Attorney, Agent, or Firm—Nies, Kurz, Bergert & Tamburro

[57] ABSTRACT

The present invention relates to a disc type brushless coreless DC motor which includes a rotor and stator. The DC motor includes a position-detecting sensor installed and secured below an effective coil part of an armature coil, and a single screw having a rounded head is installed at the position 1/5 of a magnetic pole width $\pm n\pi/2$ apart from the position-detecting sensor along a clockwise (or counter clockwise) direction when the rotating direction of the rotor is counter clockwise (or clockwise), thereby permitting the achievement of easy production, low cost, and especially light weight, and, further, larger starting torque with a lower starting voltage in the DC motor.

3 Claims, 3 Drawing Sheets

BRUSHLESS CORELESS DC MOTOR

BACKGROUND OF THE INVENTION

The present invention relates to a disk type brushless coreless DC motor, and more particularly to a disk type brushless coreless DC motor comprising a rotor made up with alternately configured N-S magnetic pole, a stator having a position-detecting sensor and a board on which more than one air cored armature coil is disposed facing the field magnet of the rotor.

And more particularly, the present invention relates to a disk type brushless coreless DC motor in which cogging force is generated by the screw combining the circuit board on which armature coils are disposed with a casing member of the stator and thereby the a dead point could be eluminated.

According to the growing tendency to lighter, thinner, smaller DC motors, efforts have been concentrated to reduce unnecessary parts and members of rotors and stators in DC motors.

As a result of those efforts, a brushless coreless DC motor has been proposed that has dead points in which the rotational torque of the rotor becomes zero because the coil torque characteristic of the armature coil in the rotational state, so such DC motors as are shown in FIG. 1 and FIG. 2 have been provided for dead point elimination.

For an example, in FIG. 1 the motor comprises a rotor made up with a rotor yoke 41 on which field magnet 42 is disposed, and a stator is made up with stator yoke 45, on which armature coil 43 is installed, and a position-detecting sensor, the stator yoke 45 being a specially structured saw tooth shape in cross section.

And in the configuration of FIG. 2, an iron bar 46 is installed for cogging torque generation in armature coil 43, instead of the saw tooth type stator yoke of FIG. 1. The flux distribution produced in the illustrated relationship of rotor field magnet 42 and iron bar 46 in a stationary state is shown in FIG. 3, and the flux distribution around the dead point is shown in FIG. 4.

On the other hand, another method has been suggested in Japanese Laid-open Utility Model Gazette Nos. Showa 61-192674, 61-192676, 62-2367, that eliminates dead points in DC motor by putting a magnetic substance for cogging torque generation at the other side of the armature coil board in a various forms in brushless coreless DC motor. With this method, the cogging torque is to be generated at the position of 22.5° with a rotor with a 4 pole field magnet, 15° with a rotor with a 6 pole field magnet, and 11.5° with a rotor with an 8 pole field magnet; i.e., cogging torque is to be generated at $\frac{1}{4}$ position of magnetic pole width. Accordingly the combined torque curve of a rotor in which a 4 pole magnet is attached becomes as in curve (a) in FIG. 5.

This combined characteristic curve represents the ideal state, where (b) represents the torque curve by armature coil, and (c) represents the cogging torque curve.

In the above methods, however, the technique of FIG. 1 involves difficulties in production because it requires a special saw tooth shaped yoke facing the field magnet of the rotor for dead point elimination, so it turned out not to be a desirable method, and also because of a peeling off problem of the coil, occurring in the assembling the process of armature coil relative to the upper face of the rotor yoke, which resulted in an increased error rate.

In the case of the technique of FIG. 2, a specially structured iron bar is to be put and held inside of the air cored armature coil, which involves difficulties in production, so this method also turned out not to be a desirable one. In addition, in the case of the preferred method disclosed in Japanese Laid-open Utility Model Gazette No. Showa 61-192674, 61-192676, and 62-2367, the separate stator yoke is to be specially cut and installed on the back side of a circuit board, so this method also turned out not to be a desirable one because of the complicated structure requiring a separate stator, yoke and accompanying difficulties in production. Especially in this method, insulation between circuit board and stator yoke is essentially required, thus the process becomes complicated with increasing cost.

Thus the prior art described above required special structures for dead point elimination in a brushless coreless DC motor, resulting in an increase in the number of components or complexity, which involved an increase of size and price, so it turned out not to be desirable.

SUMMARY OF THE INVENTION

It is an object of the present invention to provide a brushless coreless DC motor which does not require a specially structured stator yoke or increase the number of parts for dead point elimination.

It is another object of the present invention to provide a brushless coreless DC motor which, requiring no additional parts or special structure, will make it possible to maintain ease of production, low price, and light weight.

The present invention is characterized by the configuration in which the single screw, which is used to assemble and hold the circuit board of the stator inside the stator case, is to be installed at a selected specific position on the board for dead point elimination.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a brushless coreless DC motor in accordance with the present invention will now be described in detail with reference to the accompanying drawings.

Figure 1:
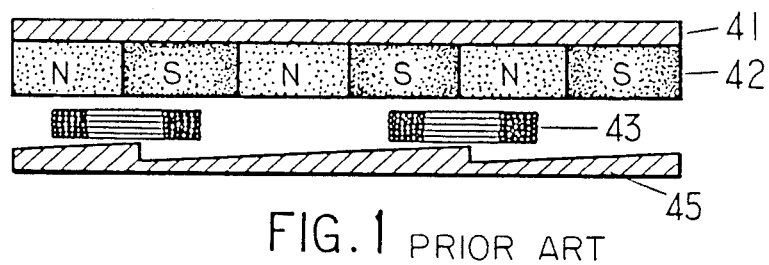
FIG. 1 is an example of a cogging torque generation method in conventional brushless coreless DC motors.
Figure 2:
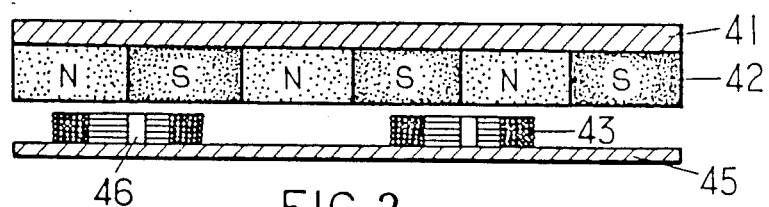
FIG. 2 is the illustration of another example.
Figure 3:
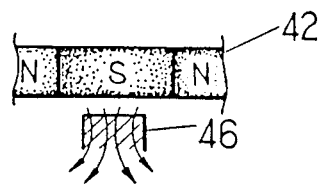
FIG. 3 shows the magnetic flux distribution of the rotor of FIG. 2 in a stationary state.
Figure 4:
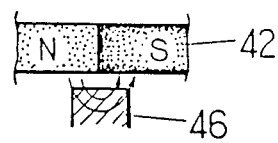
FIG. 4 shows the magnetic flux distribution of the rotor of FIG. 2 produced by the cogging torque around the dead point.
Figure 5:
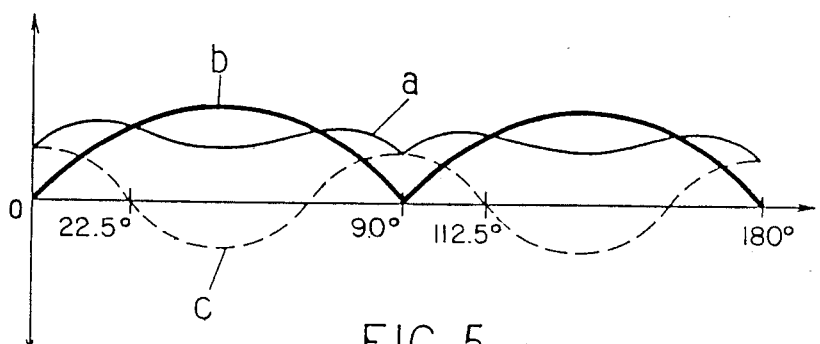
FIG. 5 is a graph showing the traditional ideal combined torque curve.
Figure 6:
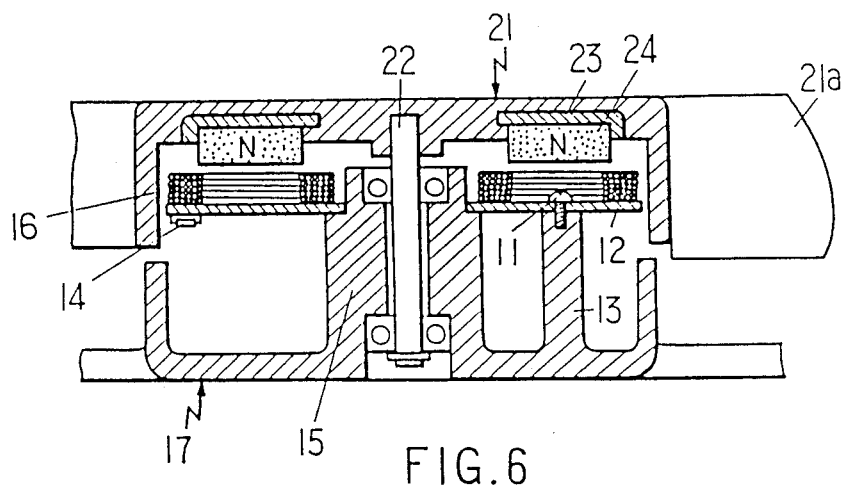
FIG. 6 is cross-sectional view of an example of a disk type brushless coreless DC motor according to the present invention.

FIG. 6 illustrates an example of a DC motor according to the present invention, wherein the central part of the rotor body 21, to the outside of which fan 21a is integrated, is coupled to the shaft 22 rotatably received in the shaft support 15 at the center of stator 17, and a ring shaped field magnet 24 and a rotor yoke 23 are disposed in and secured to the insdie of the rotor body 21.

Figure 8:
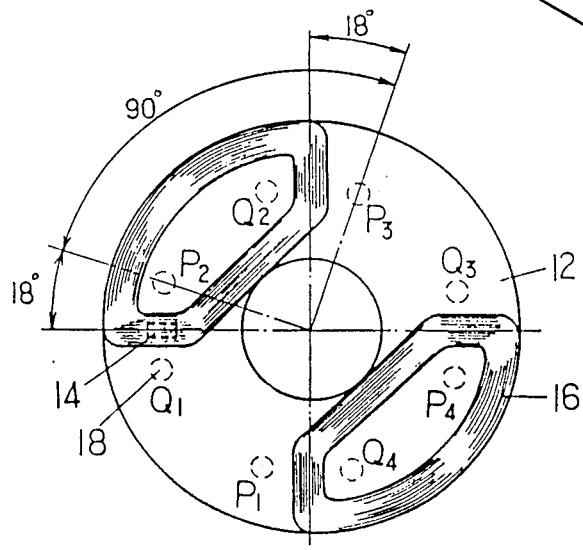
FIG. 8 is schematic diagram of the hole positions for rotor screw insertion according to the present invention.

And the circuit board 12, on which both an armature coil 16 facting the rotor field magnet 24 and a position-detecting sensor 14 are installed and secured, is to be secured on the support 13 projecting from the bottom of the stator case 17. Here, a single screw is used to assemble and hold the board 12 to the support 13. Preferably, as shown in FIG. 8, the hole 18 on the board 12 through which the screw 11 passes is to be drilled at a position, said Q1, to which the open angle from the position-detecting sensor.

14 becomes 1/5 (18° in the 4 pole case) the pole width of armature coil 16 and field magnet 24, so the screw 11 as a cogging generator is inserted and tightened to the support 13 through the hole 18 drilled in the circuit board 12 at the preferred position. The position-detecting sensor 14 is to be installed and secured below the effective coil part of the armature coil 16. If the screw insertion position is preferred position Q1, rotor body 21 rotates clockwise, and if the position is P1, rotor body 21 rotates counterclockwise.

Q1–Q4, and P2–P4 represent positions where the screw 11 may be inserted, and are obtained from the following formula.

$$Q1(P1) \pm n\pi/2 (n=0, 1, 2 \ldots)$$

or 1/5 of the magnetic pole width $\pm 2n\pi/N$ (n is a non negative integer, and N is the number of poles) and it is desirable for the single screw 11 to have a round shaped head.

Figure 7:
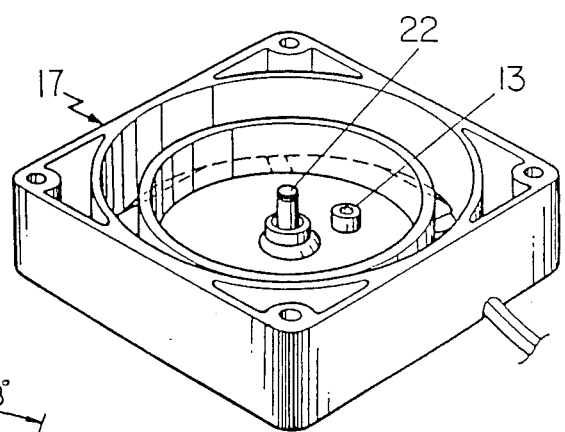
FIG. 7 is a perspective view of the rotor case of the motor shown in FIG. 6

FIG. 7 depicts an example wherein the single support 13 for receiving the screw 11 protrudes at the specified position from the inside of the stator case body 17.

The operation and advantages of this embodiment of the present invention are described as follows.

Referring to FIG. 6, FIG. 7 and FIG. 8, the stator is formed by inserting the screw 11 through the hole 18 at the Q1 position on the board 12 on which a pair of armature coils 16 are installed, to the support 13 formed at the inside of the bottom of stator case 17, the rotor body 21 is coupled on the shaft 22 rotatably carried in the stator case 17, the armature coil 16 is energized and then the brushless coreless DC motor starts rotating by the operation of the control circuit (diagram omitted) according to the position-detecting signal from the position-detecting sensor 14. At that time, the dead points are eliminated by the cogging torque generated by the head part of the screw 11 disposed at the 1/5 point of the magnetic pole width (18° in the case of 4 poles), so the rotor body rotates clockwise.

The same cogging torque and rotational torque in the same direction as above are obtained regardless which one of the Q2–Q4 positions derived from the above formula (1/5 of the magnetic pole width $\pm n\pi/2$) is selected instead of Q1 for the screw insertion position. The variable selection of the position like this gives the advantage of avoiding damage to armature coil 16 that may occur in the screw 11 insertion process when the inner diameter of the armature 16 coil is small.

Also, the same cogging torque as mentioned above is obtained when the screw 11 is installed at the P2 position, but in this case the rotor body 21 rotates counterclockwise. In this case also, the same cogging torque and rotational torque to in the same direction are obtained as long as any one of the P1, P3, P4 positions is selected for the screw insertion position.

Figure 9:
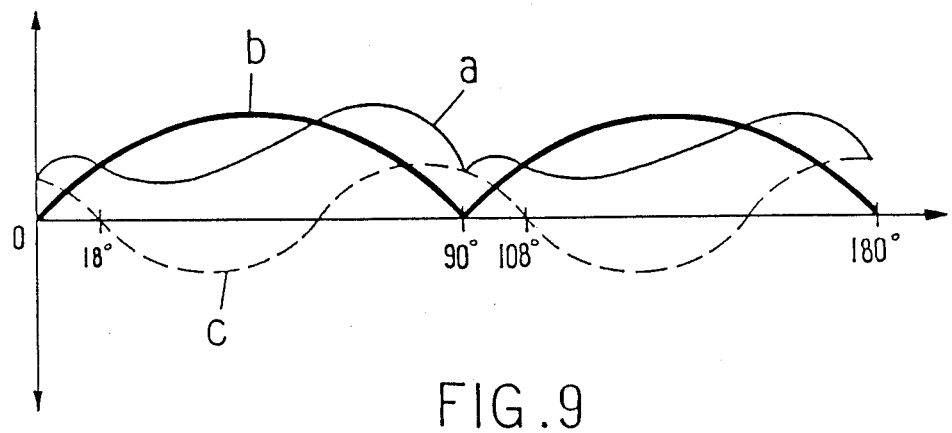
FIG. 9 is a graph showing the combined torque curve of the rotor in a motor according to the present invention.

FIG. 9 shows the combined torque curve (a) of the torque curve (b) by the armature coil 16 and the cogging torque curve (c) by the screw 11 positioned according to the present invention.

And in case the pole number for the field magnet of the rotor is different, the installation position of the screw 11 could be found with the above formula (1/5 of the magnetic pole width $\pm 2n\pi/N$).

On the other hand, the round shaped head used for the screw head concentrates the magnetic flux from the field magnet 24 facing the screw.

11, and enables the screw head to always be placed at the center of the magnet pole width, thus eliminating dead points by providing cogging torque.

Figure 10:
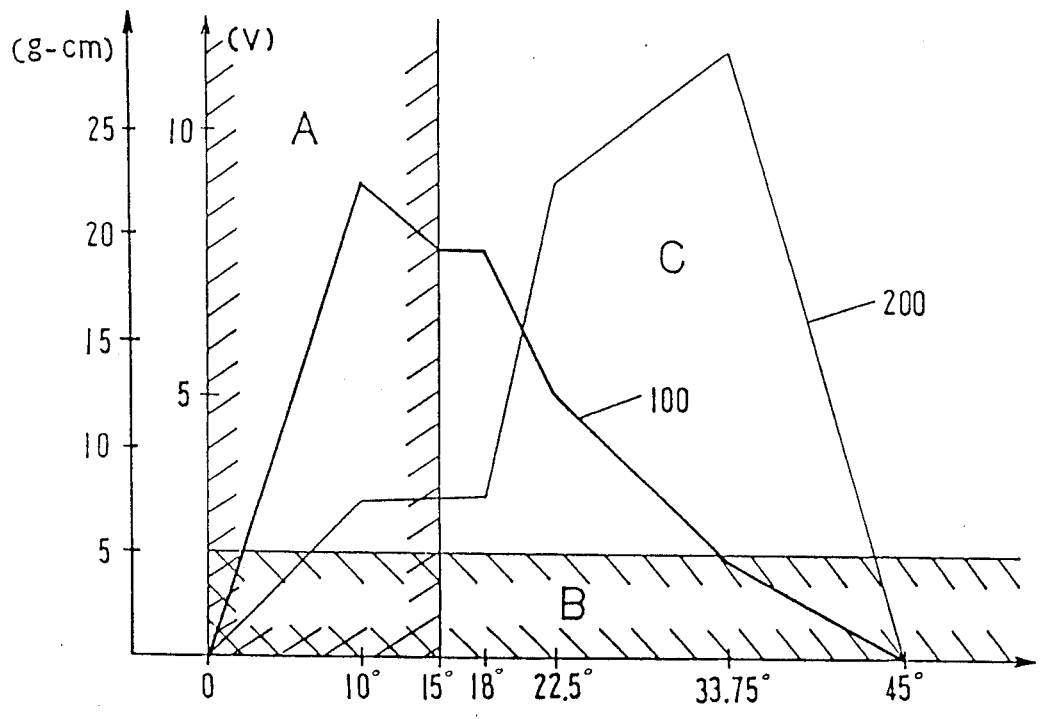
FIG. 10 is a graph showing a characteristic curve of the starting voltage and starting torque in a motor according to the present invention.

FIG. 10 shows the characteristic graph of starting voltage and starting torque that vary according to the cogging torque generation position, wherein area A represents the useless mechanical angle in which intallation of the screw is difficult for cogging torque generation, area B represents the range in which generated cogging torque is too small to start (i.e., a dead point), and area C represents the practically usable range. Accordingly, when the cogging torque generation position is set to 18° as in the mentioned example, it is noticed in accordance with the starting voltage curve 200 that the DC motor can be started with a starting voltage of about 3 V, which is a lower value compared to a conventional motor, for which the cogging torque generation position is set to 22.5°, and a starting voltage of 8 V is required.

Also, in the case where the cogging torque generation position is at 18°, the starting torque curve 100 shows that a starting torque of about 19 g-cm is generated a much larger value that contrasts with a starting torque of 12.5 g-cm generated in a conventional motor where the position is 22.5°.

Further, as is shown in the graph of FIG. 10, when the cogging torque generation position is set to anywhere, between 15°–18°, flat starting torque and starting voltage characteristics are obtained. Furthermore, as the cogging torque generation position moves from 18° to 10°, it is possible to obtain an improved starting torque and starting voltage.

As has been pointed out hereinabove, the present invention eliminates dead points without any separate parts of special structure and with only a single assembling screw in a brushless coreless DC motor including a position detecting-sensor, which enables to easy production, low cost, and especially light weight.

Many widely different embodiments of the present invention may be constructed without departing from the spirit and scope of the present invention.

It should be understood that the present invention is not limited to the specific embodiments described in the specification, except as defined in the appended claims.

I claim:

1. A brushless coreless DC motor comprising: a rotor including a field magnet having 2P N-S magnetic poles (P is an integer greater than 0) and a predetermined open angle, a stator including more than one armature coil which generates rotational torque, the stator facing the rotor and having the same open angle as that of the field magnet, and a position-detecting sensor carried on a circuit board secured to the stator, wherein the position-detecting sensor is installed and secured below an effective coil part of the armature coil, and a single magnetic cogging screw is installed at a position defined by 1/5 of a magnetic pole width $\pm n\pi/2$ (where n is a non negative integer) apart from the position-detecting sensor in a direction relative to the sensor corresponding with a desired direction of rotation of the rotor.

2. A brushless coreless DC motor as claimed in claim 1, wherein the cogging screw has a round head.

3. A brushless, coreless DC motor as claimed in claim 1, wherein the cogging screw position relative to the position-detecting sensor for generating cogging torque is from 15° to 18° of the angular pole width of the armature coil and the field magnet.

* * * * *